US012559265B2

(12) United States Patent
Hochdorf et al.

(10) Patent No.: US 12,559,265 B2
(45) Date of Patent: Feb. 24, 2026

(54) OFF-CHANNEL UNMANNED AERIAL VEHICLE REMOTE ID BEACONING

(71) Applicant: Skydio, Inc., San Mateo, CA (US)

(72) Inventors: Eyal Hochdorf, Palo Alto, CA (US); Ajay Pathak, Fremont, CA (US)

(73) Assignee: Skydio, Inc., San Mateo, CA (US)

( * ) Notice: Subject to any disclaimer, the term of this patent is extended or adjusted under 35 U.S.C. 154(b) by 223 days.

(21) Appl. No.: 18/124,527

(22) Filed: Mar. 21, 2023

(65) Prior Publication Data

US 2023/0294848 A1     Sep. 21, 2023

Related U.S. Application Data

(60) Provisional application No. 63/321,821, filed on Mar. 21, 2022.

(51) Int. Cl.
B64U 20/80     (2023.01)

(52) U.S. Cl.
CPC ........ B64U 20/80 (2023.01); B64U 2201/104 (2023.01); B64U 2201/20 (2023.01)

(58) Field of Classification Search
CPC .............. B64U 20/80; B64U 2201/104; B64U 2201/20; B64U 10/14; B64U 2101/30; H04W 4/44
See application file for complete search history.

(56) References Cited

U.S. PATENT DOCUMENTS

| | | | |
|---|---|---|---|
| 2006/0271251 A1* | 11/2006 | Hopkins .............. | G05D 1/0022 701/2 |
| 2009/0168738 A1* | 7/2009 | Trainin ................. | H04W 16/14 370/342 |
| 2013/0215757 A1* | 8/2013 | Vandwalle .......... | H04W 40/244 370/241 |
| 2014/0269400 A1* | 9/2014 | Aldana ................. | H04W 64/00 370/253 |
| 2014/0355527 A1* | 12/2014 | Vaidya .................. | H04W 76/15 370/329 |
| 2016/0119770 A1* | 4/2016 | Ryu .......................... | G01S 1/00 370/328 |
| 2022/0069876 A1* | 3/2022 | Xue .................... | H04B 7/18504 |
| 2022/0286247 A1* | 9/2022 | Liu ....................... | H04L 5/0051 |

* cited by examiner

*Primary Examiner* — Kito R Robinson
*Assistant Examiner* — Roy Rhee

(57)     ABSTRACT

Provided herein are various enhancements for unmanned aerial vehicles and operations. An unmanned aerial vehicle includes a wireless communication system configured to establish a wireless link for at least flight control information for the unmanned aerial vehicle. The wireless communication system is configured to monitor the flight control information using a first wireless channel having a first bandwidth and periodically tune away to a second wireless channel having a second bandwidth wider than the first bandwidth for transmission of a beacon frame that includes remote identification information corresponding to the unmanned aerial vehicle.

20 Claims, 6 Drawing Sheets

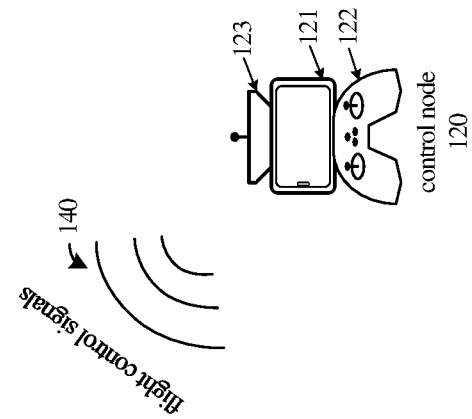
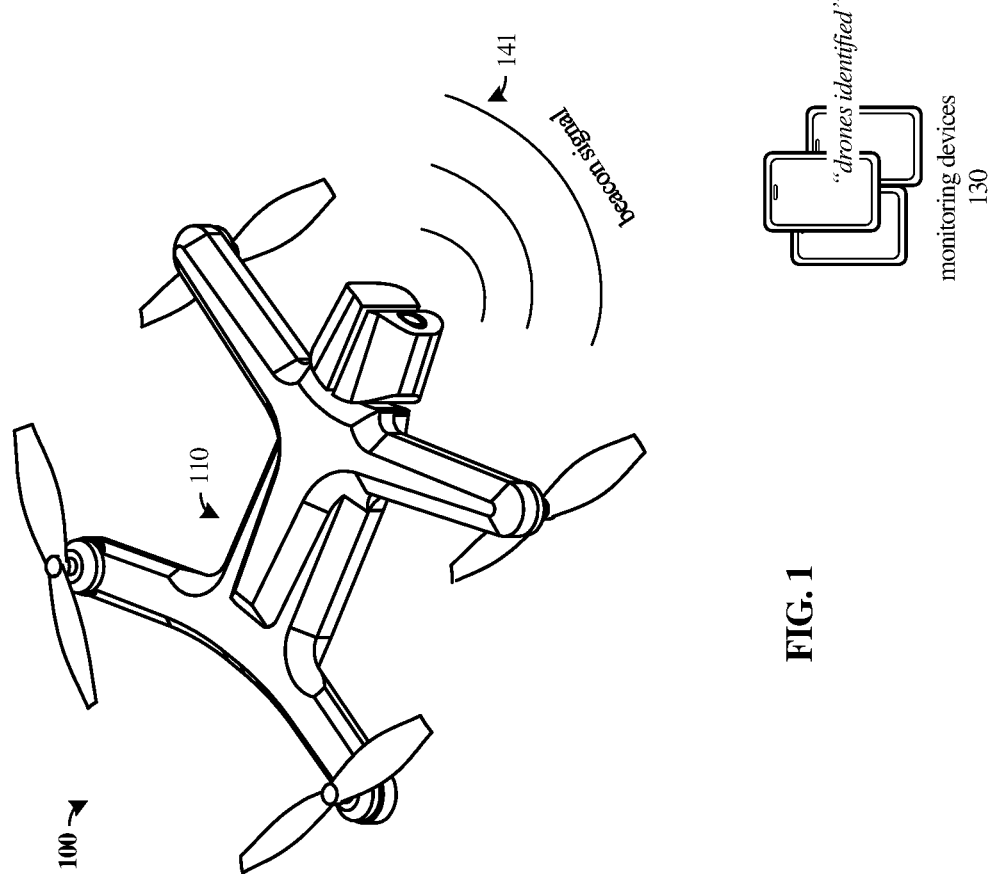
FIG. 1

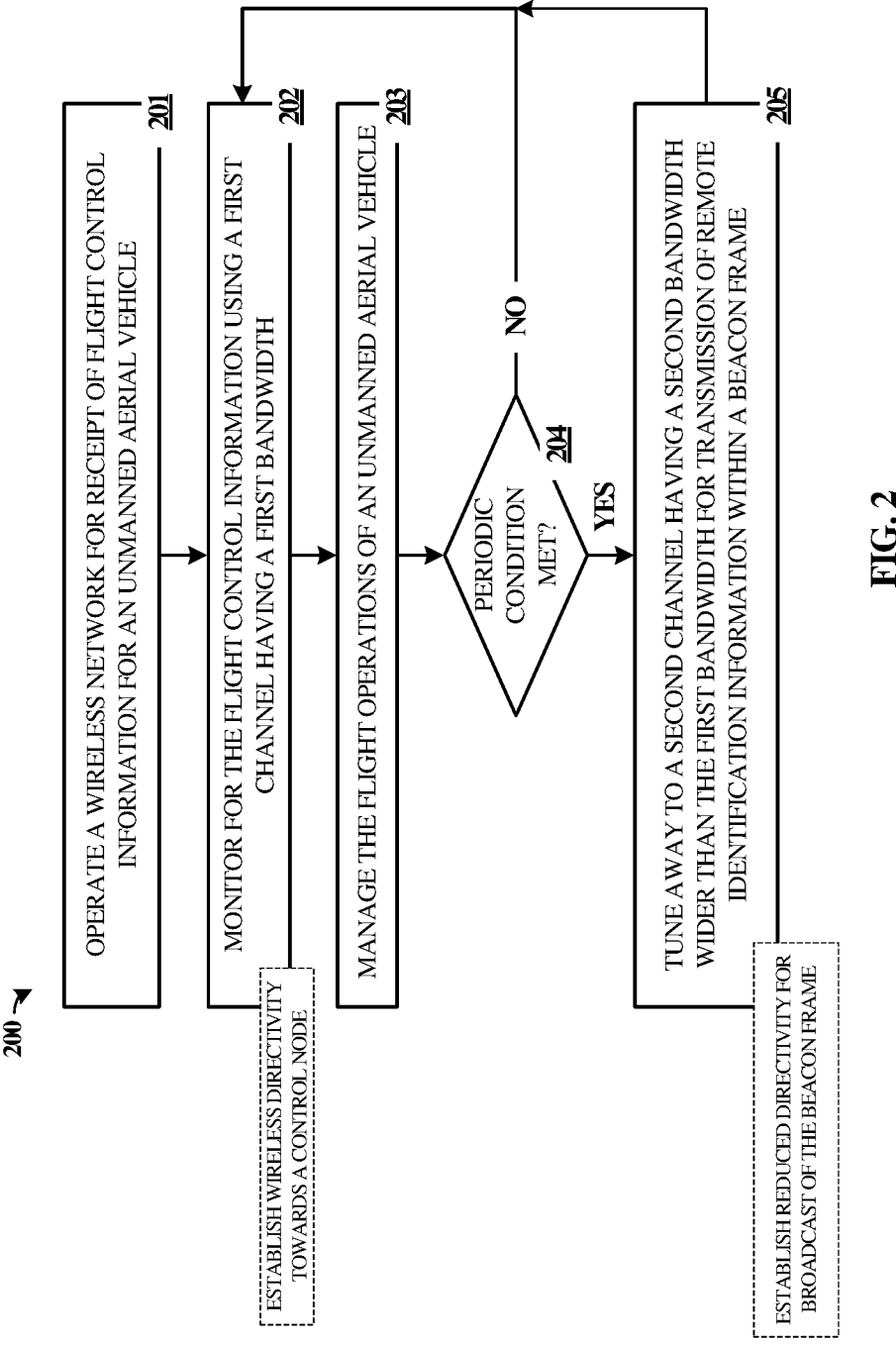

200

OPERATE A WIRELESS NETWORK FOR RECEIPT OF FLIGHT CONTROL INFORMATION FOR AN UNMANNED AERIAL VEHICLE
201

ESTABLISH WIRELESS DIRECTIVITY TOWARDS A CONTROL NODE

MONITOR FOR THE FLIGHT CONTROL INFORMATION USING A FIRST CHANNEL HAVING A FIRST BANDWIDTH
202

MANAGE THE FLIGHT OPERATIONS OF AN UNMANNED AERIAL VEHICLE
203

PERIODIC CONDITION MET?
204

NO

YES

TUNE AWAY TO A SECOND CHANNEL HAVING A SECOND BANDWIDTH WIDER THAN THE FIRST BANDWIDTH FOR TRANSMISSION OF REMOTE IDENTIFICATION INFORMATION WITHIN A BEACON FRAME
205

ESTABLISH REDUCED DIRECTIVITY FOR BROADCAST OF THE BEACON FRAME

FIG. 2

| | |
|---|---|
| – – – Ch0Pat0-Ch1Pat0 | 601 |
| ········· Ch0Pat0-Ch1Pat1 | 602 |
| —··— Ch0Pat0-Ch1Pat2 | 603 |
| —·— Ch0Pat1-Ch1Pat0 | 604 |
| ········· Ch0Pat1-Ch1Pat1 | 605 |
| ········· Ch0Pat1-Ch1Pat2 | 606 |
| –·–·– Ch0Pat2-Ch1Pat0 | 607 |
| –···– Ch0Pat2-Ch1Pat1 | 608 |
| –··–·· Ch0Pat2-Ch1Pat2 | 609 |

OFF-CHANNEL UNMANNED AERIAL VEHICLE REMOTE ID BEACONING

RELATED APPLICATIONS

This application hereby claims the benefit of and priority to U.S. Provisional Patent Application No. 63/321,821, titled "Techniques for Off-Channel UAV-Based Remote ID Beaconing," filed Mar. 21, 2022, which is hereby incorporated by reference in its entirety.

TECHNICAL BACKGROUND

Unmanned aerial vehicles (e.g., UAVs, also known as drones) are commonly used to capture video, images, or other data from a vantage point or location that might otherwise be difficult or cumbersome to reach. Drones are used for various purposes, such as for recreation, scientific exploration, military operations, intelligence gathering, and commercial uses. Drones for commercial and recreational use typically have multiple rotors so that they are agile and rapidly responsive to flight commands. For example, a popular configuration known as a "quadcopter" comprises four rotors for flight. Drones can be remotely controlled by control nodes, typically over a wireless link, or have semi-autonomous or fully-autonomous features.

As drone activity has increased, various regulatory bodies have begun to mandate "remote identification" for drones. Remote identification, or Remote-ID, includes a digital identification system for drones deployed in the air, akin to physical licenses for cars on the roads. The rules generally require drones to broadcast basic information about the drone and flight characteristics using wireless links, such as wireless local area network (WLAN) links or Bluetooth links. A technical means of compliance was proposed by the ASTM International (ASTM), formerly known as American Society for Testing and Materials, technical standards organization. For a broadcast Remote-ID solution, ASTM would allow the use of either Bluetooth or WLAN. Under the WLAN approach, the drone would use a NAN (Neighbor Aware Network) service discovery packet every one second in a designated channel. The NAN standard incurs significant overhead and performance degradation for drone communication and is not very widely adopted. A more effective and ubiquitous alternative is known as the WLAN beacon. Although not included in the original ASTM standard, the WLAN beacon embedded approach is actively being evaluated by and/or presented to several regulatory bodies.

Remote-ID standards call for drones to send an identification message at least once per second. The message can include information regarding the location of the drone, location of the pilot or ground control station, drone altitude, drone direction, and other relevant information. As part of the standard, a WLAN, such as Institute of Electrical and Electronics Engineers (IEEE) 802.11x Wi-Fi is identified as the mechanism by which the information should be transmitted. The standard further suggests the use of a WLAN beacon information element mechanism to add the data. A WLAN beacon is a standard mechanism in WLAN to broadcast various network information provided by a WLAN access point. The ASTM standards call for broadcast of WLAN beacon information that includes Remote-ID information over an active drone operating channel every 200TU (time unit, 1024 microseconds) or, alternatively, the use of a "social channel" where the broadcast repeat rate is only once per second. The social channel is recognized as channel 6 on the 2.4 GHz Wi-Fi band or channel 149 on the 5 GHz Wi-Fi band.

Overview

Technology for operating an unmanned aerial vehicle (UAV), or drone, is disclosed herein. The examples include broadcasting Remote-ID information for a drone using a WLAN beacon frame during operation of the drone by remote control over a wireless link. In one example, an unmanned aerial vehicle includes a wireless communication system configured to establish a wireless link for at least flight control information for the unmanned aerial vehicle. The wireless communication system is configured to monitor the flight control information using a first wireless channel having a first bandwidth and periodically tune away to a second wireless channel having a second bandwidth wider than the first bandwidth for broadcast of a beacon frame that includes remote identification information corresponding to the unmanned aerial vehicle.

In another example, a method includes establishing, by an unmanned aerial vehicle, a wireless link for at least control information for flight operations of the unmanned aerial vehicle. The method also includes monitoring for the control information using a first wireless channel having a first bandwidth and periodically tuning away to a second wireless channel having a second bandwidth wider than the first bandwidth for broadcasting a beacon frame that includes remote identification information for the unmanned aerial vehicle.

In yet another example, an apparatus includes one or more computer readable storage media, and program instructions stored on the one or more computer readable storage media. The program instructions are executable by a processing system to direct the processing system to at least control a wireless communication system to monitor flight control information for an unmanned aerial vehicle using a first wireless channel having a first bandwidth and periodically tune away to a second wireless channel having a second bandwidth wider than the first bandwidth to broadcast a beacon frame that includes remote identification information for the unmanned aerial vehicle.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 1 illustrates an unmanned aerial vehicle control architecture in an implementation.

FIG. 2 illustrates unmanned aerial vehicle control operations in an implementation.

DETAILED DESCRIPTION

Figure 3:
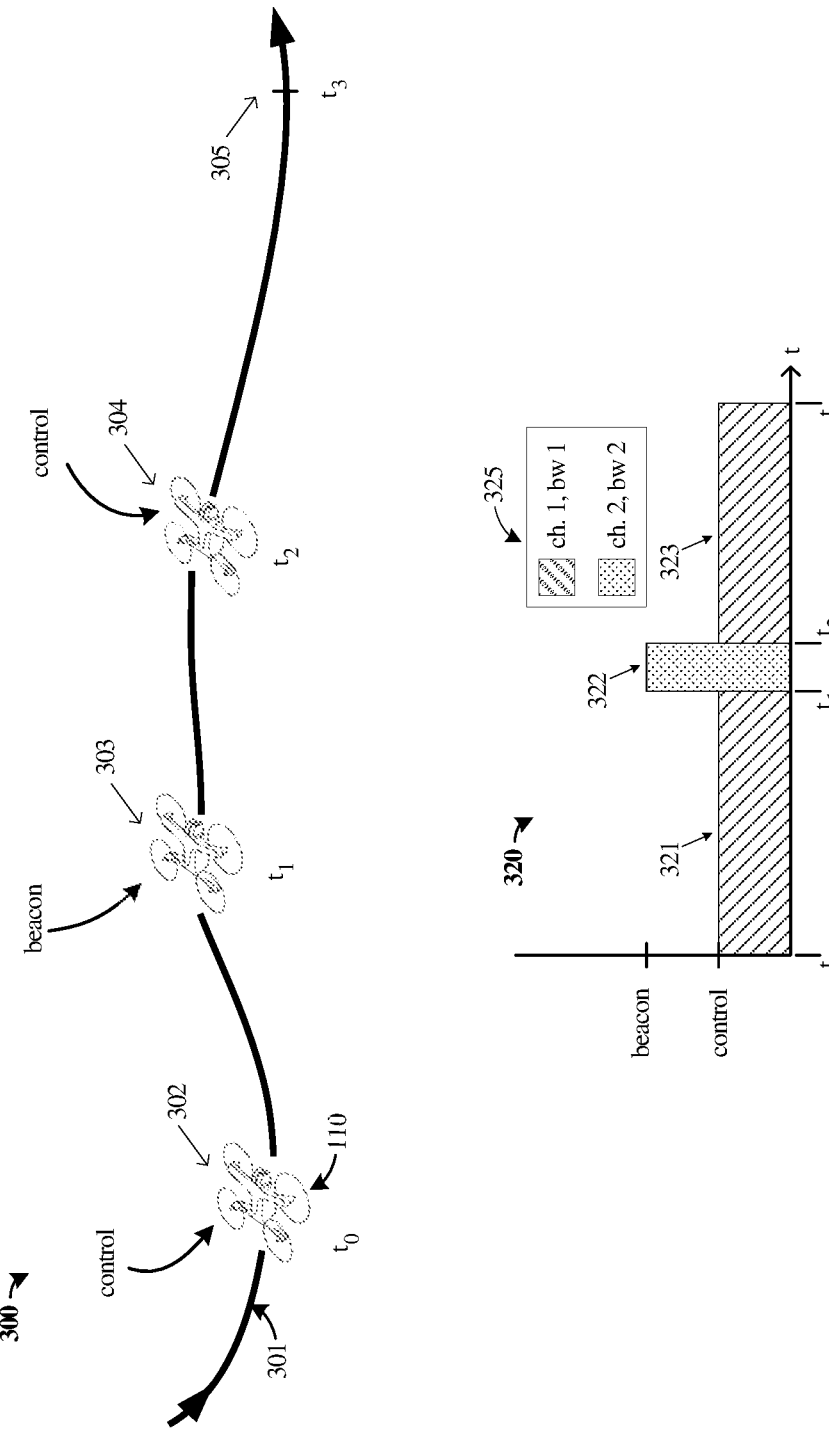
FIG. 3 illustrates unmanned aerial vehicle control operations in an implementation.

Techniques and systems for operating an unmanned aerial vehicle (UAV), or drone, are disclosed herein. Drone Remote-ID standards call for airborne drones to periodically send an identification message regarding the location of the drone, location of the pilot or ground control station, drone altitude, drone direction, drone serial number, and other relevant information. Thus, the Remote-ID can include static information (e.g., drone identity or serial number) and dynamic information (e.g., drone location or pilot location). The included examples broadcast Remote-ID information for a drone within a wireless local area network (WLAN) or Wi-Fi beacon frame during flight operations. Advantageously, Remote-ID standards can be met using the techniques discussed herein, while still providing for remote control of a drone over a narrowband wireless link that can provided extended range.

Referring now to the drawings, FIG. 1 illustrates system 100 that includes unmanned aerial vehicle (UAV) 110, control node 120, and monitoring devices 130. In operation, control node 120 can provide flight control signals 140 as operational inputs to UAV 110, and is typically operated by a human pilot or operator remotely located from UAV 110. UAV 110 can provide various data and feedback to control node 120, such as on-board sensor data as well as captured images or video. Control node 120 provides at least a portion of the flight control information used to operate UAV 110, which can include real-time piloting or control of flight operations of UAV 110. In addition, control node 120 can operate in concert with UAV 110 to affect operational elements of UAV 110 and establish programmed or computed flight or operation plans which direct drone position, drone orientation, or sensor operation in flight, and other information relating to the particular use or capabilities of the UAV, such as map data or topographical data.

Control node 120 comprises a flight command and control unit for UAV 110, and can include various computing devices with user input devices, such as mobile computing devices, tablets, smartphones, laptops, and other similar devices. Control node 120 can include user interface devices 121-122, such as control pads, joysticks, buttons, touchpads, touchscreens, keyboards, virtual/augmented reality systems, cameras, microphones, and other equipment used to interface with control node 120 and control flight operations of UAV 110. Control node 120 can include various wireless communication circuitry 123 and related systems and software, such as wireless network communication equipment, radio frequency transmission/receiver equipment, antennas, directional antenna circuitry and equipment, or optical communication equipment. Specific wireless protocols, frequencies, channels, bands, bandwidths, and the like, are discussed below, and are supported by circuitry and systems included in both control node 120 and UAV 110 to establish wireless communication links.

Monitoring devices 130 can be positioned anywhere in a region proximate to UAV 110, and typically comprise mobile computing devices or smartphone devices that can receive beacon signals 141 transmitted by UAV 110. Monitoring devices 130 might be unaffiliated with control node 120 or UAV 110, and instead be associated with third-parties which may desire to monitor for any nearby UAV activity. Monitoring devices 130 might run an application or mobile app which provides a user interface that presents information related to discovered UAVs. A portion of this information can be received from UAV 110, such as that provided in the remote-ID information transferred as discussed herein. As a part of this activity, monitoring devices 130 can scan across various wireless signaling, typically wireless networking signaling, to discover UAVs via the remote-ID information.

Turning now to a more detailed discussion of the operation of elements in FIG. 1, operations 200 are included in FIG. 2. Reference is made to elements of FIG. 1 when discussing operations 200, although these operations can be applied to different elements discussed herein. In operation 201, a radio system of UAV 110 operates a wireless local area network for receipt of flight control information. This wireless network can be provided by a wireless network access point (AP) included in UAV 110. In some examples, the wireless network comprises an Institute of Electrical and Electronics Engineers (IEEE) 802.11-compliant network, also referred to as a Wi-Fi network or WLAN. Various versions, radio frequency (RF) configurations, and data rates are included in the IEEE 802.11x suite of standards, and any can be implemented by UAV 110 and control node 120.

UAV 110 monitors (operation 202), for the flight control information using a first channel having a first bandwidth. The first channel can comprise any suitable frequency band or channel supported by UAV 110 and control node 120, although this typically will include a channel defined within the 802.11 WLAN specification. The first bandwidth comprises a narrow band channel bandwidth, which corresponds to a smaller bandwidth relative to a bandwidth defined by the 802.11 WLAN specification for the first channel. UAV 110 can utilize narrowband channel bandwidths to optimize a signal to noise ratio and to extend range when communicating with control node 120. However, narrowband channels are not compliant with the regular WLAN standard and, thus, beacons are not received by standard monitoring devices, such as smartphones, executing remote-ID applications. When UAV 110 operates in a narrowband channel, both UAV 110 and control node 120 are configured to narrowband operations, but consequently are not compliant with the standard-defined WLAN central frequency and bandwidth. To comply with the standard, UAV 110 must transition to a wider bandwidth. Unfortunately, transitioning the entire network to a new bandwidth requires significant delays, e.g., ~65 ms, and further, may jeopardize the connection, such as when control node 120 does not detect UAV 110 has changed transmit or receive bandwidth settings for the WLAN. The technology described herein describes a process for sending Remote-ID messages that comply with the ASTM standard over a wideband standard-compliant Wi-Fi channel, while allowing for narrowband channels using WLAN signaling for flight control. Moreover, this is achieved using the same RF/radio circuitry and antennas for both narrowband and wideband operation, such that two separate transmitters or receivers are not employed to handle the different wideband/narrowband functionality. Thus, the Remote-ID information can be transmitted using the same RF radio and antennas that is used to receive flight control operations.

In addition to narrowband operation for communications between UAV 110 and control node 120, UAV 110 can establish wireless directivity towards control node 120. UAV 110 can establish wireless directivity towards control node 120 over a set of directional antennas for receipt of the flight control information. UAV 110 can include an array of antennas arranged about the chassis or fuselage of UAV 110 to provide RF connectivity over a variety of angles and elevations. A subset of the array of antennas can be employed to only transmit or receive RF energy in a particular direction or angular sweep to enhance gain for the RF energy to/from control node 120. As an example, assume UAV 110 includes six antennas. At any given time, two out of the six might be transmitting a signal that maximizes operation for the communication link in a specific direction (e.g., for communication with control node 120).

For clarity, a standard WLAN/Wi-Fi bandwidth for a given channel is defined to be a 'wide' band due in part to the high data rates and large number of client devices supported. There are many frequency bands that have been incorporated into the WLAN standards, and each frequency band is typically subdivided into a number of channels, each having a standard-defined bandwidth. However, for transmission of beacon signals for a wireless local area network (WLAN), a bandwidth of 20 MHz is specified. This bandwidth for beacon signals, and thus the included Remote-ID information, is applicable to various frequency bands, such as the 2.4 GHz Wi-Fi band or the 5 GHz Wi-Fi band. Other frequency bands can be employed in other WLAN/Wi-Fi standards, however, the channel bandwidths are well defined and comprise wideband configurations. Thus, the term narrowband, as referred to herein, refers to a transmission using a given channel that uses a bandwidth narrower than a bandwidth specified by the Remote-ID requirements for Wi-Fi/WLAN of 20 MHz. The exact bandwidth of a narrowband transmission can vary based on current conditions, distance between control node 120 and UAV 110, noise levels in the vicinity of control node 120 and UAV 110, or other conditions. Example narrowband bandwidths include 5 MHz or 10 MHz, which are narrower compared to a wideband bandwidth of 20 MHz.

As flight control operations are received from control node 120 over the narrowband channel, UAV 110 can accordingly manage the flight operations of UAV 110 (operation 203). These flight operations include various motion control activities, flight changes, updates to itineraries or programmatic routes, map-based control activities, sensing command and control activities, and the like. Typically, flight control operations indicate velocity, directional, or orientation changes for UAV 110 that move or orient UAV 110 as desired by a pilot or operator at control node 120.

During flight control operations, a beacon signal is periodically transmitted when a periodic condition has been met (operation 204). The periodic condition can comprise a timer, counter, cyclic period, or other condition which prompts UAV 110 to transfer a beacon signal including Remote-ID information. Responsive to the periodic condition, in operation 205, UAV 110 tunes away to a second channel having a second bandwidth wider than the first bandwidth for transmission of Remote-ID information within a beacon frame associated with the WLAN. UAV 110 can act as a Wi-Fi/WLAN access point, and as such can periodically transmit beacon signaling or beacon frames which provide clients or endpoints with information about the access point.

Figure 5:
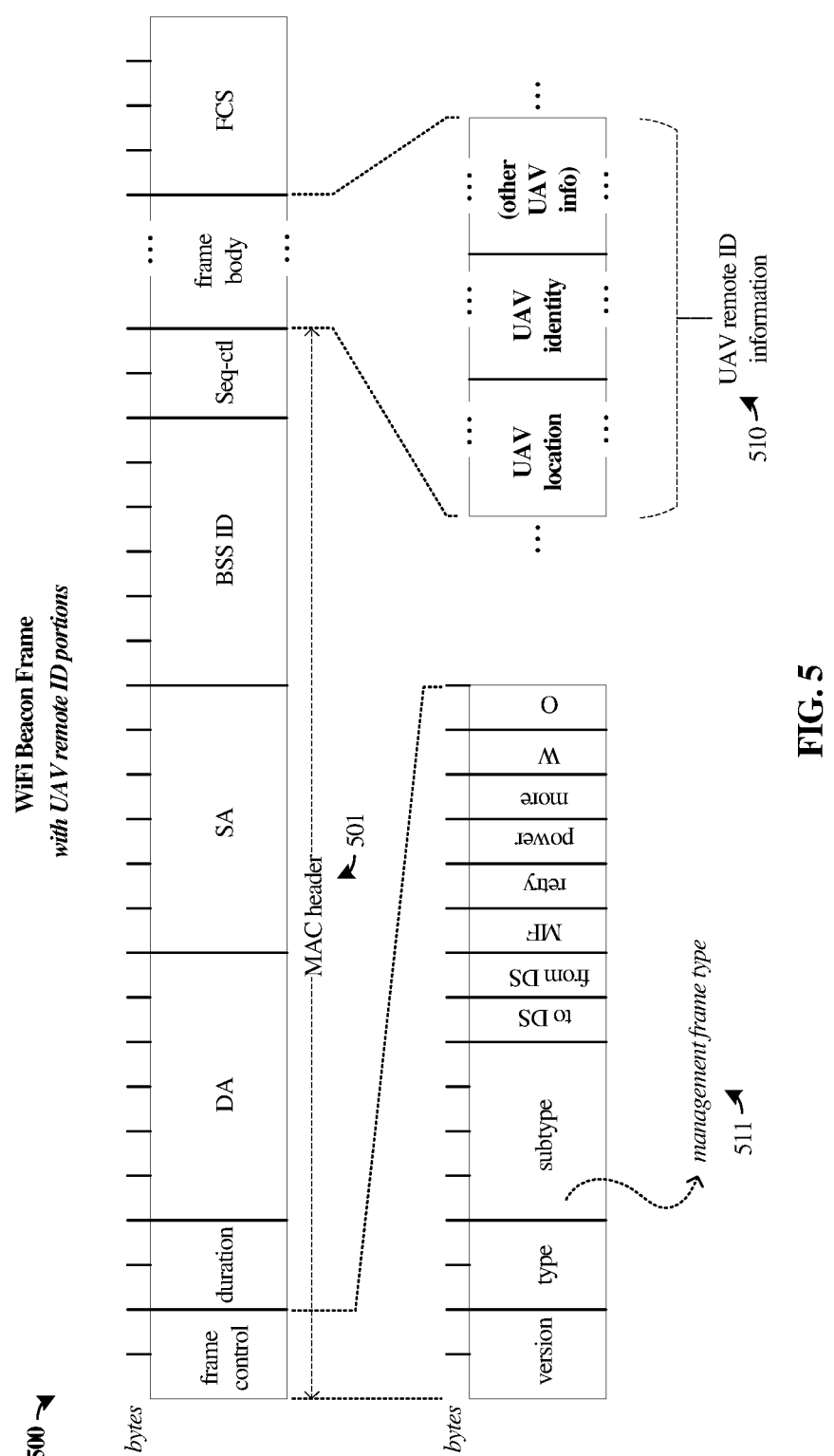
FIG. 5 illustrates example management frames for Remote-ID in an implementation.

FIG. 5 illustrates an example beacon frame 500 that includes Remote-ID information. Within the 802.11 group of standards, the beacon signal or frame(s) contain the following frame format in bytes: (frame type 0 subtype 8). The 28 octets long frame header 501 consists of Frame Control, Duration, Address 1 (DA), Source Address (SA), BSS ID, Sequence Control and HT Control fields. The Frame Control portion of header 501 can indicate various frame type/subtype information, such as a subtype corresponding to a beacon frame or management frame. Header

501 is followed by a variable length frame body or payload, which can be up to 2320 octets long. Frame Check Sequence (FCS) is a 4-byte long field used to perform cyclic redundancy check for validating the received frames. The frame body consists of a series of fields that are classified as fixed element fields followed by fields that are variable size information elements. Information elements are identified by their respective unique Element ID. Each has 3 parts: ID, Length and information. The European Aerospace and Defense Industries Association of Europe-Standardization (ASD-STAN) has provided a draft standard that uses Information Element IE221 for the purpose of Remote ID broadcast within the beacon frame.

Beacon frames are broadcasted openly and can be detected by all Wi-Fi/WLAN-compatible devices as part of a standard channel scan operation that is applied within any operational client device automatically. For example, a WLAN-capable phone or laptop can have the ability to detect and extract relevant information from a beacon frame, which is a type of management frame indicated in a subtype field 511. The WLAN beacon signal only sends a single packet (e.g., beacon frame 500), not forming any discovery windows and or creating a network. Clients can perform passive scans which does not add any additional overhead to the channel.

Remote ID information 510 can be included in the payload or frame body of beacon frame 500 for delivery to and extraction by client devices. The following information can be included in Remote ID information 510, as a portion or payload of beacon frame 500: UAS operator registration number; unique serial number of the UAV; a timestamp; geographical position of the UAV and its height above the ground take-off point; route course and ground speed of the UAV; geographical position of the remote pilot, or the take-off point; and UAS emergency status for Class C1, C2, C3, among other fields and information.

Returning to the operations of FIG. 2, the tune away operation includes an initial state of a first wireless channel having a first bandwidth, which is tuned away from to a second wireless channel having a second bandwidth wider than the first bandwidth. This can be achieved by the same radio or RF circuitry without requiring two separate radios on UAV 110. An off-channel scan operation provides a quick change from a first channel to a second channel, often with channel calibration parameters pre-cached in the radio to allow for faster switchover of frequency. However, off-channel scans are typically only performed by client devices (e.g., endpoints) seeking which access points are present in an area (passive listening for APs), or for a client device to transmit a probe signal for receipt by an access point (active probing for APs). However, in this example, the access point of UAV 110 will actually perform an off-channel transmit of the beacon frame that includes the Remote-ID information on a different channel than used for flight operations. Also, the bandwidth will change during the off-channel operation to a wider bandwidth, such as changing from a narrow 5 or 10 MHz bandwidth on the flight operations channel to a wide 20 MHz or greater bandwidth for the beacon signal transmission. While the channel for the flight operation (e.g., first wireless channel) can vary based on the operating conditions (i.e., noise, channel crowding, ambient conditions), the channel for the beacon signal will typically comprise a social channel for the WLAN. This social channel is more frequency checked by client devices, and in some examples includes at least one among channel 6 on a Wi-Fi 2.4 gigahertz (GHz) band or channel 149 on a Wi-Fi 5 GHz band.

After the beacon signal is transmitted, UAV 110 tunes back to the flight control operations channel and bandwidth. Because of the quick nature of the off-channel transmit operation, UAV 110 is only out of contact with control node 120 for approximately 10 milliseconds (ms). During this short time, UAV 110 is configured to manage flight operations without instructions from control node 120, which can include continuing on a previous course or set of flight operations. This process of tuning away to transmit the beacon signal can occur every 1 second to comply with various Remote-ID standards.

The mechanism presented herein allows UAV 110 to send a WLAN beacon in wide band without moving the entire WLAN/network to wide band operation. Specifically, the Access Point (AP) of UAV 110 transitions to the social channel for a brief period of time, sends the beacon signal (frame/packet), and returns to the narrow band channel for flight operations. Advantageously, UAV 110 withholds any channel switch announcement, such that the beacon signal is sent without a channel switch announcement, which avoids transitioning the entire network, including control node 120 and other clients/endpoints, to a new channel. Accordingly, the off-channel transmit operation is kept to a minimum time so as to only send the beacon signal before tuning back to the original channel for flight operations.

Some of the Remote-ID rules are directed to omni-directional transmission power. One of the challenges of a UAV or drone is that there are occluded areas from terrain, obstacles, or other flight-variable conditions, and the rules allow for a relaxation in that regard. For drones that are using directional antennas, obtaining omni-directionality is a challenge. One solution is to transmit multiple Remote-ID messages in all directions. This approach appears in the previously mentioned Remote-ID rules. However, this implementation can be undesirable. Accordingly, the techniques described herein can use multiple channels to send a single beacon signal. In some implementations, the beacon signal can be sent using the 802.11a/g standard on two adjacent directional antennas within the same angular sweep or direction so that the coverage includes the combination of both antennas. In such instances, directional antennas are able to meet the rules for remote Remote-ID without transmitting the same message on non-adjacent directional antennas or antennas on opposite sides of a drone. Thus, reduced directivity is established by UAV 110 for the beacon signal, while enhanced directivity is established for by UAV 110 for the flight control operations signals.

Figure 6:
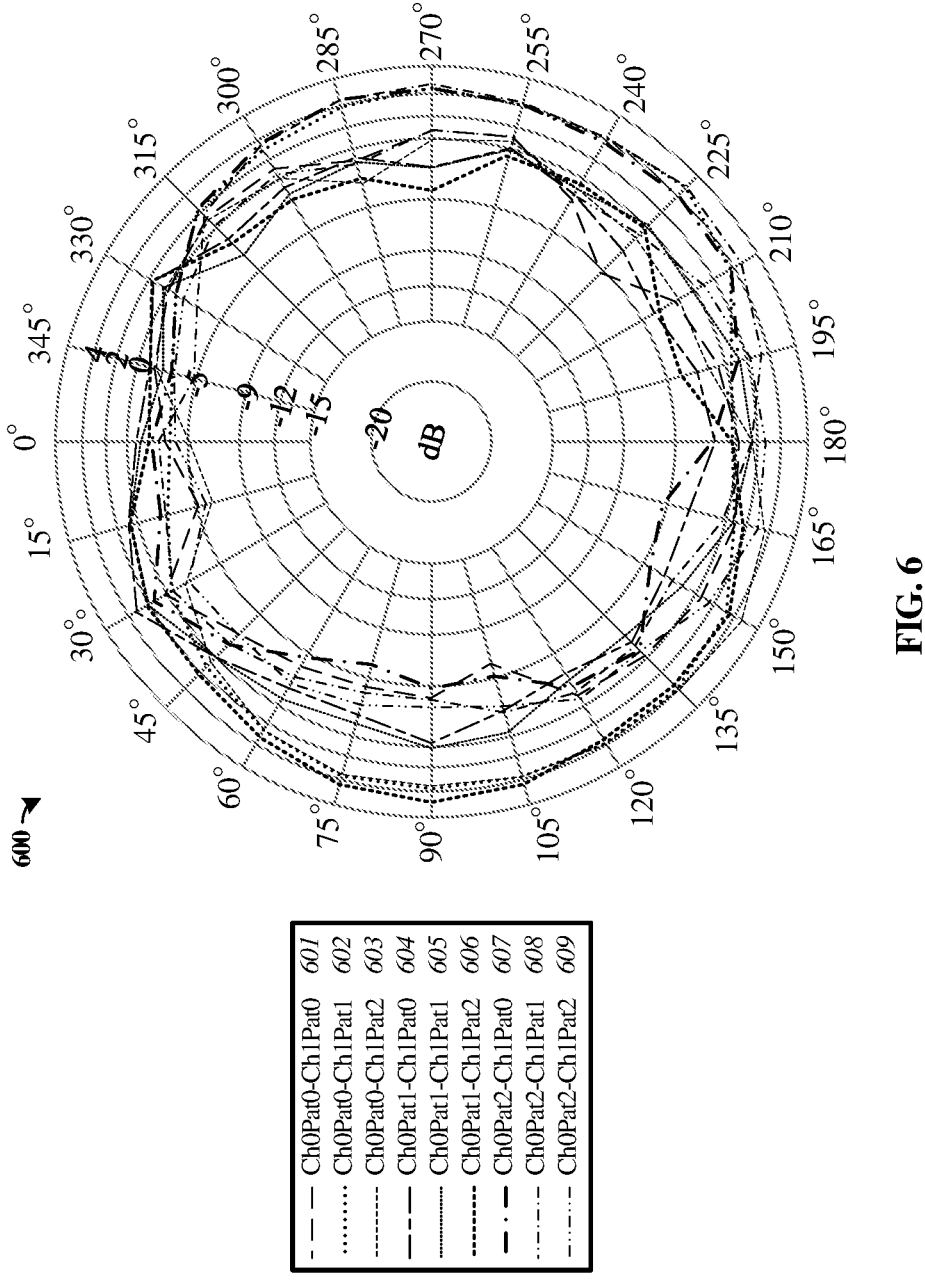
FIG. 6 illustrates example antenna radiation patterns in an implementation.

As an example, FIG. 6 shows graph 600 including radiation patterns 601-609 of a drone with six antennas. At any given time, two out of the six might be transmitting a signal that maximizes operation for the communication link in a specific direction (enhanced directivity). While this is the primary goal of this antenna selection for flight operations, Remote-ID operations have different goals—namely to reach as many endpoints/clients in an omnidirectional manner. FIG. 6 shows how the required output power and coverage for Remote-ID operations can be achieved with any of two selected antennas. As shown in FIG. 6, some of the nine combinations of patterns (601-609) are not used, but for most combinations, a drone with six antennas is able to satisfy the requirement while maintaining the following example having an aggregate average gain and peak to average approach. Specifically, this includes where 2.4G US/JP/EU output power is set at 23/19/16 dBm. Worse case average gain is set at −3 dBi, worse case Peak to average is set at −4 dBi (excluding pattern 0,0), and worse case average EIRP 20/16/13 dBm passing the average criteria. In an absolute minimum gain approach, worse case gain is −7 dBi and worse case is 16/12/9 dBm—passing minimum criteria for all combinations. The techniques demonstrate that the included implementations can satisfy Remote-ID messages on directional antennas by sending a message over two similarly-directed antennas at the same time rather than sending in multiple directions over multiple antennas.

FIG. 3 illustrates a further operational example 300 of UAV 110 during flight operations along flight path 301. Flight path 301 includes several waypoints of note, namely waypoints 302-305 along a timeframe that includes $t_0$, $t_1$, $t_2$, and $t_3$. Additionally, graph 320 corresponds times $t_0$, $t_1$, $t_2$, and $t_3$ to specific channels/bandwiths employed by UAV 110. Waypoint 302 corresponds to a timeframe ($t_0$) that UAV 110 monitors for flight control operations from control node 120, waypoint 303 corresponds to a timeframe ($t_1$) that UAV 110 performs a tune away operation to broadcast or otherwise transmit a beacon signal, waypoint 304 corresponds to a timeframe ($t_2$) that UAV 110 monitors for flight control operations from control node 120, and waypoint 305 can correspond to a future time ($t_3$) or target position for UAV 110.

Graph 320 illustrates a continuum of operation for UAV 110. Area 321 corresponds to a time from $t_0$ to $t_1$ when a first wireless channel and first bandwidth are employed for flight control operations of UAV 110. Area 322 corresponds to a time from $t_1$ to $t_2$ when a second wireless channel and second bandwidth employed for beacon signal transmission by UAV 110. Area 323 corresponds to a time from $t_2$ to $t_3$ when a first wireless channel and first bandwidth are resume for flight control operations of UAV 110. This process can repeat to periodically alternate between monitoring for flight control operations and transmission of the beacon signal/frame.

Thus, the operations in FIG. 3 provide for a UAV 110 that includes a wireless communication system to establish a wireless network for receipt of flight control information for UAV 110. The wireless communication system of UAV 110 is configured to monitor the flight control information using a first wireless channel having a first bandwidth and periodically tune away a radio to a second wireless channel having a second bandwidth wider than the first bandwidth for transmission of a beacon frame for the wireless network that includes remote identification information corresponding to the unmanned aerial vehicle. The remote identification information indicates at least an identity of UAV 110 and a location resultant from flight operations of UAV 110. The remote identification information can be included in a management portion of the WLAN beacon frame for a wireless access point of UAV 110 providing the wireless network.

The first bandwidth comprises a bandwidth narrower than the second bandwidth selected to provide a target range of the unmanned aerial vehicle with respect to control node 120. Additionally, during timeframes $t_0$ to $t_1$ and $t_2$ to $t_3$, the wireless communication system can be configured to establish wireless directivity towards control node 120 over a set of directional antennas for receipt of the flight control information. The second wireless channel comprises an Institute of Electrical and Electronics Engineers (IEEE) 802.11 channel having the second bandwidth of at least a 20 megahertz (MHz). The tune away from the first wireless channel to the second wireless channel can include at least performing an off-channel transmit on a social channel of the wireless network corresponding to at least one among channel 6 on a 2.4 GHz band or channel 149 on a 5 GHz band, among other social channels specified by wireless standards. The wireless communication system can be configured to establish, during timeframe $t_1$ to $t_2$, a reduced directivity for broadcast of the beacon frame by at least concurrently transmitting the beacon frame over at least two directional antennas previously used to establish the directivity with respect to control node 120 during timeframes $t_0$ to $t_1$ and $t_2$ to $t_3$. In this example, a client channel switch announcement is withheld before switching to the second wireless channel for transmission of the beacon frame.

During timeframe $t_1$ to $t_2$, a flight system of UAV 110 can be configured to operate UAV 110 without the flight control information being provided from control node 120. This might include determining a low-risk, straight-line path, or continuing along a pre-programmed path, or loitering operations. However, since the tune away time is typically less than 10 ms, momentum of electromechanical flight components of UAV 110 might be sufficient to provide for continued operations. However, the flight system of UAV 110 is configured to be aware of momentary tune away operations so as to not halt flight operations, or flag or otherwise alert errors during timeframe $t_1$ to $t_2$.

Advantageously, UAV 110 can provide for narrowband enhanced range operations with control node 120 while satisfying periodic wideband Remote-ID broadcasting. Conventionally, off-channel scan operations are only used by endpoint devices or client devices to send probe signals to APs or to listen for APs. In contrast the examples herein provide for using off-channel transmit operations by an AP to send a beacon signal to endpoint devices, while using a Wi-Fi/WLAN standard bandwidth. This can reduce the time that a drone is out-of-contact with a control node, comply with Remote-ID standards, and provide enhanced operational flight for a drone, among other technical advantages.

Figure 4:
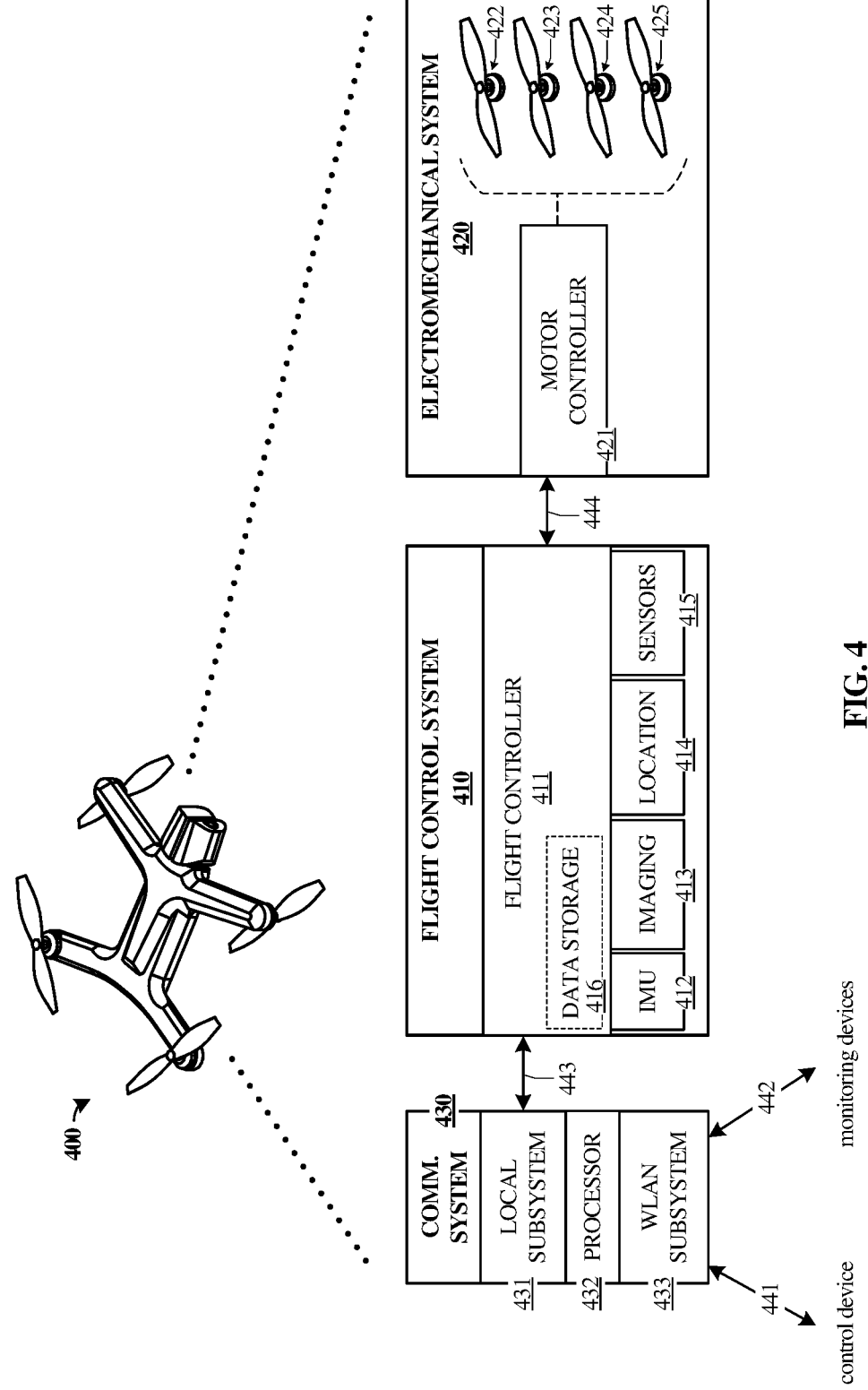
FIG. 4 illustrates an unmanned aerial vehicle in an implementation.

Turning now to a specific architecture and implementation of a drone or UAV, FIG. 4 is presented. FIG. 4 can comprise an example implementation of UAV 110, although variations are possible. FIG. 4 includes drone 400 comprising flight control system 410, electromechanical system 420, and communication system 430. Flight control system 410 communicates over link 443 with local subsystem 431 of communication system 430. Flight control system 410 communicates over link 444 with motor controller 421 of electromechanical system 420. Flight control system 410, electromechanical system 420, communication system 430, and links 443-444 can be included on the same circuit board or set of circuit boards, or instead included in separate and communicatively coupled modules, among other configurations.

Flight control system 410 includes flight controller 411, inertial measurement unit (IMU) 412, imaging system 413, location system 414, and sensors 415. IMU 412 provides inertial measurement and data, such as from on-board accelerometers or gyroscopes, which determines orientation and position information for drone 400. In combination with data from IMU 412, location system 414 can determine physical locations, orientations, and altitudes, among other logistical information for drone 400. Location system 414 can include a global positioning system device, such as for receiving and interpreting GPS signals, or other signals transmitted by various other global positioning services. Location system 414 can produce coordinates that correspond to a geographic location of drone 400. Sensors 415 and imaging system 413 comprise various sensing elements to capture optical images, video, infrared/ultraviolet data, temperature, pressure, sound, moisture, chemicals, vibrations, or other various physical parameters. The monitored parameters or captured optical information can be digitized, compressed, encrypted, encoded, packetized, or otherwise altered for transport to a remote control terminal or other remote devices, as well as stored locally for later retrieval.

Flight controller 411 can comprise one or more microprocessors, logic devices, or processing circuitry that retrieves and executes software from an included data storage system 416. Storage system 416 may comprise any tangible computer readable storage media readable by processing system flight controller 411 and capable of storing software. Storage system 416 may include volatile and nonvolatile, removable and non-removable media implemented in any method or technology for storage of information, such as computer readable instructions, data structures, program modules, or other data. In no case is the computer readable storage media a propagated signal.

This software stored by storage system 416 can be executed to control various aspects of drone operation, such as controlling speed and operation of motors 422-425 by way of issuing instructions to motor controller 421. Storage system 416 can also store data collected by various on-board circuitry and systems, such as imaging data, video data, location data, inertial data, static drone identification data (serial numbers, identities, network addresses, ownership information, etc.).

Electromechanical system 420 may include motor controller 421 which can provide an electronic speed controller unit and various rotors coupled to motors 422-425, as well as power supplies, batteries, and the like. Motor controller 421 includes circuitry capable of making adjustments to position, orientation, speed, or other movement parameters for drone 400.

Communication system 430 local subsystem 431, processor 432, and WLAN subsystem 433, among other elements. Processor 432 can comprise similar elements as discussed above for flight controller 411, including data storage elements. Local subsystem 431 includes circuitry and communication interfaces that interwork between processor 432, WLAN subsystem 433, and flight control system 410 over link 443. Link 443 can include various wired, wireless, optical, or electromagnetic interfaces, such as Universal Serial Bus (USB), wired, wireless, or optical Ethernet, System Management Bus, Inter-Integrated Circuit (I2C), peripheral component interconnect—express (PCIe), or other various links.

WLAN subsystem 433 includes circuitry and antenna elements for communicating wirelessly with remote devices, as well as for establishing wireless local-area networks (WLANs) and communicating wirelessly to be compliant with Wi-Fi standards, Bluetooth standards, or other wireless communication standards. WLAN subsystem 433 includes various circuitry providing a radio system including transmitters, receivers, transceivers, amplifiers, filters, and signal conversion elements, among other elements. Communication system 430 includes elements to communicate over at least two wireless channels having different bandwidths, such as to provide wireless links 441-442. Communication system 430 can establish an access point for handling Institute of Electrical and Electronics Engineers (IEEE) 802.11 communications with endpoints or client devices, such as using 2.4 GHz, 3.6 GHz, 5 GHz, 6 GHz, or 60 GHz, or other frequency bands. WLAN subsystem 433 can store calibration parameters in non-transitory storage media for use in switching among communication bands or communication channels.

WLAN subsystem 433 communicates with processor 432 which can provide various input parameters and information to WLAN subsystem 433. For example, processor 432 can establish the periodic timeframes over which to transmit beacon signals, instruct WLAN subsystem 433 on bandwidths and channels to use for various communications, and provide Remote-ID information determined by flight control system 410 and received over local subsystem 431 and link 443. In some examples, WLAN subsystem 433 can bundle the Remote-ID information into one or more frames for wireless transfer over link 442. In other examples, WLAN subsystem 433 can receive an already formed beacon frame with Remote-ID information inserted, as provided by flight control system 410.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various, elements, techniques, and operations discussed herein are employed according to the descriptions above. However, it should be understood that the disclosures and enhancements herein are not limited to these enumerated elements, techniques, and operations, and can be applicable across a range of suitable elements, techniques, and operations. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An unmanned aerial vehicle comprising:
a wireless communication system comprising a radio configured to establish a wireless local area network using a first wireless channel comprising a first bandwidth for monitoring at least flight control information for the unmanned aerial vehicle;
the wireless communication system configured to periodically tune the radio away to a second wireless channel comprising a second bandwidth wider than the first bandwidth with an off-channel transmit operation to broadcast a beacon frame over the second wireless channel indicating remote identification information corresponding to the unmanned aerial vehicle;
the wireless communication system configured to, responsive to transmitting the beacon frame, tune the radio back from the second wireless channel to the first wireless channel; and
wherein, for the periodic tuning away by the radio to the second wireless channel, a client channel switch announcement is withheld from transmission over the first wireless channel such that the wireless local area network avoids transition to the second bandwidth and the devices on the first wireless channel are not transitioned to the second wireless channel.

2. The unmanned aerial vehicle of claim 1, wherein the remote identification information indicates an identity of the unmanned aerial vehicle and a location resultant from flight operations of the unmanned aerial vehicle.

3. The unmanned aerial vehicle of claim 1, wherein the first bandwidth is selected among at least 5 megahertz (MHz) and 10 MHz to provide a target range of the unmanned aerial vehicle with respect to a control node; and
wherein the second wireless channel comprises an Institute of Electrical and Electronics Engineers (IEEE) 802.11 channel having the second bandwidth of at least 20 MHz.

4. The unmanned aerial vehicle of claim 1, wherein the radio is configured to periodically tune away from the first wireless channel to the second wireless channel by at least performing an off-channel transmit to a social channel of a selected wireless band.

5. The unmanned aerial vehicle of claim 1, wherein the remote identification information is included in a management portion of the beacon frame for a wireless access point providing the wireless local area network.

6. The unmanned aerial vehicle of claim 1, wherein the wireless communication system is configured to cache channel calibration parameters for the second wireless channel in the radio for the tune away to the second wireless channel.

7. The unmanned aerial vehicle of claim 1, comprising:
a flight system configured to perform fight operations for the unmanned aerial vehicle without receipt of the flight control information over the first wireless channel during the tune away to the second wireless channel.

8. The unmanned aerial vehicle of claim 1, comprising:
the wireless communication system configured to establish wireless directivity towards a control node over a set of directional antennas for receipt of the flight control information; and
the wireless communication system configured to establish reduced directivity for transmission of the beacon frame.

9. The unmanned aerial vehicle of claim 8, comprising:
the wireless communication system configured to establish the reduced directivity by at least concurrently transmitting the beacon frame over at least two of the directional antennas used to establish the directivity towards the control node.

10. A method, comprising:
establishing, by a radio of an unmanned aerial vehicle, a wireless local area network using a first wireless channel comprising a first bandwidth for monitoring control information directing at least flight operations of the unmanned aerial vehicle;
periodically tuning the radio away to a second wireless channel comprising a second bandwidth wider than the first bandwidth with an off-channel transmit operation to broadcast a beacon frame over the second wireless channel indicating remote identification information for the unmanned aerial vehicle; and
responsive to transmitting the beacon frame, tuning the radio back from the second wireless channel to the first wireless channel; and
wherein, for the periodic tuning away by the radio to the second wireless channel, a client channel switch announcement is withheld from transmission over the first wireless channel such that the wireless local area network avoids transition to the second bandwidth and the devices on the first wireless channel are not transitioned to the second wireless channel.

11. The method of claim 10, wherein the remote identification information indicates an identity of the unmanned aerial vehicle and a location resultant from the flight operations of the unmanned aerial vehicle.

12. The method of claim 10, wherein the first bandwidth is selected among at least 5 megahertz (MHz) and 10 MHz to provide a target range of the unmanned aerial vehicle with respect to a control node; and wherein the second wireless channel comprises an Institute of Electrical and Electronics Engineers (IEEE) 802.11 channel having the second bandwidth of at least 20 MHz.

13. The method of claim 10, wherein periodically tuning the radio away to the second wireless channel comprises performing an off-channel transmit to a social channel of a selected wireless band.

14. The method of claim 10, wherein the remote identification information is included in a management portion of the beacon frame for a wireless access point providing the wireless local area network.

15. The method of claim 10, comprising:

caching channel calibration parameters for the second wireless channel in the radio for the tune away to the second wireless channel.

16. The method of claim 10, wherein during the tune away to the second wireless channel, the unmanned aerial vehicle is configured to perform fight operations without receipt over the first wireless channel of the control information for the flight operations.

17. The method of claim 10, comprising:

establishing wireless directivity towards a control node over a set of directional antennas for receipt of the control information; and establishing reduced directivity for transmission of the beacon frame.

18. An apparatus, comprising:

one or more computer readable storage media;

program instructions stored on the one or more computer readable storage media, the program instructions executable by a processing system to direct the processing system to at least:

control a radio of a wireless communication system to establish a wireless local area network using a first wireless channel comprising a first bandwidth to monitor flight control information for an unmanned aerial vehicle, periodically tune away from the first wireless channel to a second wireless channel comprising a second bandwidth wider than the first bandwidth with an off-channel transmit operation that broadcasts a beacon frame over the second wireless channel indicating remote identification information for the unmanned aerial vehicle;

responsive to transmitting the beacon frame, tune the radio back from the second wireless channel to the first wireless channel;

wherein, for the periodic tuning away by the radio to the second wireless channel, a client channel switch announcement is withheld from transmission over the first wireless channel such that the wireless local area network avoids transition to the second bandwidth and the devices on the first wireless channel are not transitioned to the second wireless channel.

19. The apparatus of claim 18, wherein the remote identification information indicates an identity of the unmanned aerial vehicle and a location resultant from flight operations of the unmanned aerial vehicle; and wherein the remote identification information is included in a management portion of the beacon frame for a wireless access point providing the wireless local area network.

20. The apparatus of claim 18, wherein the first bandwidth is selected among at least 5 Mhz and 10 Mhz to provide a target range of the unmanned aerial vehicle with respect to a control node; and wherein the second wireless channel comprises an Institute of Electrical and Electronics Engineers (IEEE) 802.11 channel having the second bandwidth of at least 20 MHz.

* * * * *